US011375671B2

(12) United States Patent
Camaren (10) Patent No.: US 11,375,671 B2
(45) Date of Patent: Jul. 5, 2022

(54) CONCENTRIC BLADE TRIMMING SYSTEM WITH AUTO-ADJUSTING BLADES

(71) Applicant: Beau Camaren, Galt, CA (US)

(72) Inventor: Beau Camaren, Galt, CA (US)

(*) Notice: Subject to any disclaimer, the term of this patent is extended or adjusted under 35 U.S.C. 154(b) by 760 days.

(21) Appl. No.: 16/373,439

(22) Filed: Apr. 2, 2019

(65) Prior Publication Data

US 2019/0299218 A1 Oct. 3, 2019

Related U.S. Application Data

(60) Provisional application No. 62/651,526, filed on Apr. 2, 2018.

(51) Int. Cl.
*A01G 3/00* (2006.01)
*A23N 15/02* (2006.01)

(52) U.S. Cl.
CPC ............. *A01G 3/00* (2013.01); *A23N 15/02* (2013.01); *A01G 2003/005* (2013.01)

(58) Field of Classification Search
CPC .... A01G 3/00; A01G 2003/005; A23N 15/02; B26D 7/0691; B02C 17/002; B02C 17/02; B02C 18/062; A01F 7/062
USPC .................... 460/126, 135; 99/634, 639, 640
See application file for complete search history.

(56) References Cited

U.S. PATENT DOCUMENTS

| 1,068,004 A * | 7/1913 | Northrop | A23N 15/02 |
| | | | 100/98 R |
| 6,220,534 B1 * | 4/2001 | Kratochwill | B01D 33/11 |
| | | | 241/74 |
| 8,544,777 B2 * | 10/2013 | Tsai | B29B 17/0026 |
| | | | 241/82.5 |
| 9,682,488 B2 * | 6/2017 | Beyerlein | A01G 3/00 |
| 10,506,768 B2 * | 12/2019 | Albertz | A01D 46/005 |
| 2012/0085848 A1 * | 4/2012 | Sharp | B02C 17/002 |
| | | | 241/220 |
| 2012/0279193 A1 * | 11/2012 | Mosman | A01G 3/00 |
| | | | 56/233 |
| 2014/0196587 A1 * | 7/2014 | Beyerlein | A01G 3/00 |
| | | | 83/331 |
| 2015/0273527 A1 * | 10/2015 | Kelly | A23N 11/00 |
| | | | 209/288 |

(Continued)

FOREIGN PATENT DOCUMENTS

| CN | 108543583 A | * | 9/2018 | ............. B02C 17/02 |
| CN | 110584166 A | * | 12/2019 | ............. A23N 12/10 |

(Continued)

*Primary Examiner* — Alicia Torres
(74) *Attorney, Agent, or Firm* — Myers Andras Ashman Bisol LLP; Joseph C. Andras (57) ABSTRACT

A Concentric Blade Trimming System with Adjustable Blades. The System includes at least one pair of rotating drums within which are rotating cutting blade assemblies. The system allows the user to load untrimmed buds continuously, and to generate an efficient, continuous flow of trimmed buds as output. The cutting blade assemblies rotate within the rotating drums independently. The cutting blade assemblies also include apparatus that will automatically adjust the blade position relative to the interior walls of the drums so that the trimming process can continue without the need to shut down for blade adjustment. In an alternate version, the blades are flexible and their adjustment is conducted manually with only a short intermission in operation of the system.

19 Claims, 13 Drawing Sheets

(56) References Cited

U.S. PATENT DOCUMENTS

| | | | |
|---|---|---|---|
| 2015/0290827 A1* | 10/2015 | Evans | A01G 3/0435 |
| | | | 83/698.11 |
| 2017/0164557 A1* | 6/2017 | Harold | A01D 46/02 |
| 2017/0197217 A1* | 7/2017 | Bruggemann | A23N 15/00 |
| 2018/0008656 A1* | 1/2018 | Watts | B01D 46/30 |
| 2019/0124851 A1* | 5/2019 | Ingram | A01D 34/53 |
| 2020/0298245 A1* | 9/2020 | Seydelmann | A22C 17/004 |
| 2020/0338566 A1* | 10/2020 | Bruggemann | A01G 3/002 |

FOREIGN PATENT DOCUMENTS

| | | | | |
|---|---|---|---|---|
| FR | 2898286 A1 * | 9/2007 | | B02C 17/002 |
| SU | 1003799 A * | 3/1983 | | |

\* cited by examiner

CONCENTRIC BLADE TRIMMING SYSTEM WITH AUTO-ADJUSTING BLADES

This application is filed within one year of, and claims priority to Provisional Application Ser. No. 62/651,526, filed Apr. 2, 2018.

1. FIELD OF THE INVENTION

This invention relates generally to horticultural tools and apparatus and, more specifically, to a Concentric Blade Trimming System with Adjustable Blades.

2. DESCRIPTION OF RELATED ART

Figure 1A:
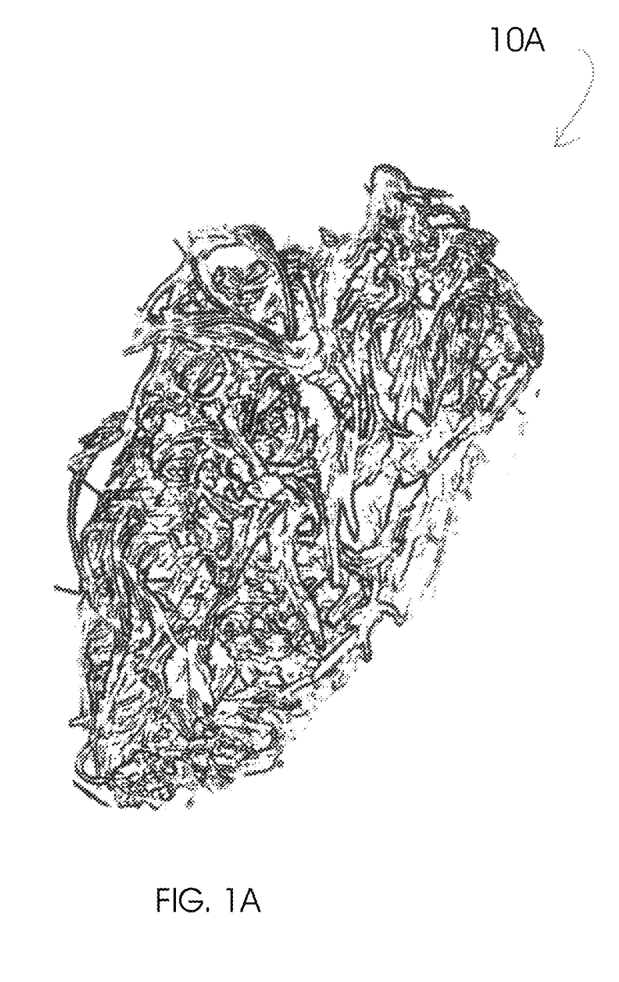
FIGS. 1A and 1B are untrimmed and trimmed *cannabis* buds, respectively.
Figure 1B:
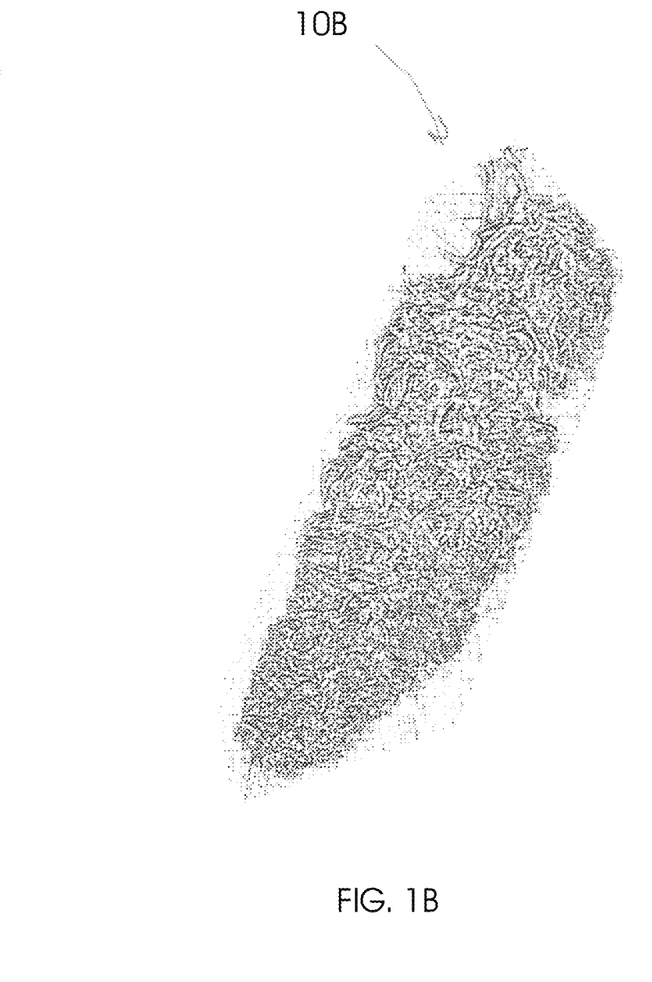

*Cannabis* has become legalized in several of the United States. The result of this legalization is an exponential increase in demand for the crop. This increased demand has resulted in increased cultivation and harvesting of the plant. The most commercially desirable portion of the *cannabis* plant is the flower or "bud" due to its high level of THC, and general potency. Once a bud has been harvested, it must be "cleaned" or "trimmed" before it is suitable for drying and ultimately distributing for consumption. FIGS. 1A and 1B depict the before- and after-trimming conditions of a conventional *cannabis* bud. The untrimmed *cannabis* bud 10A is essentially encased within an outer matrix of small leaves. The trimming process involves the removal of these leaves until only the "bud" remains as shown in FIG. 10B.

In small-scale operations, the trimming process is done by hand with small scissors or the like. As production grows, however, it becomes economically unfeasible to hand-trim the buds. As a consequence, mechanical systems have evolved.

Figure 2:
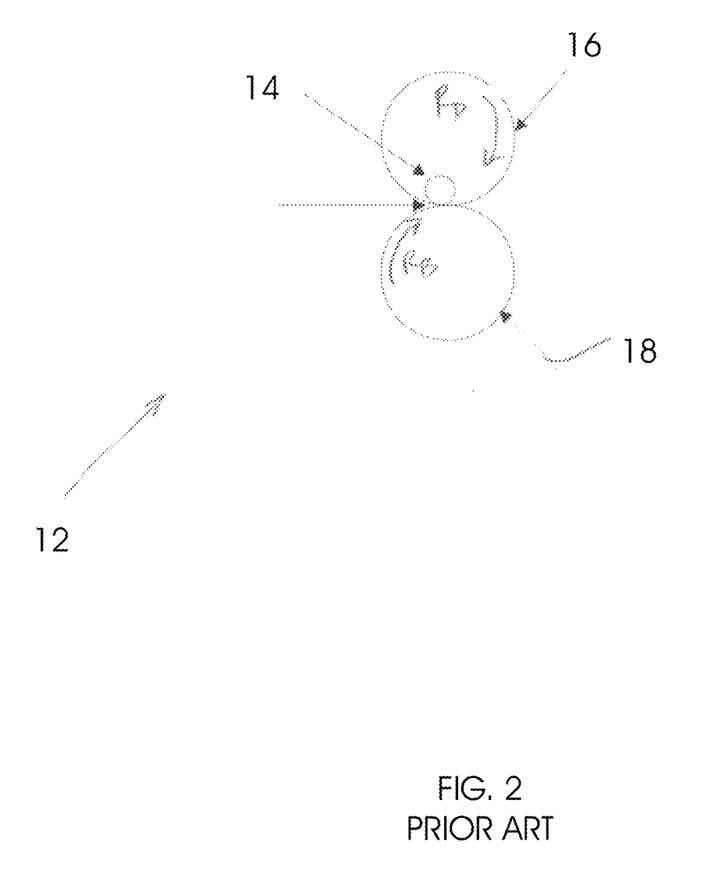
FIG. 2 is a line diagram of the essential components of a conventional tumbler trimmer.
Figure 3:
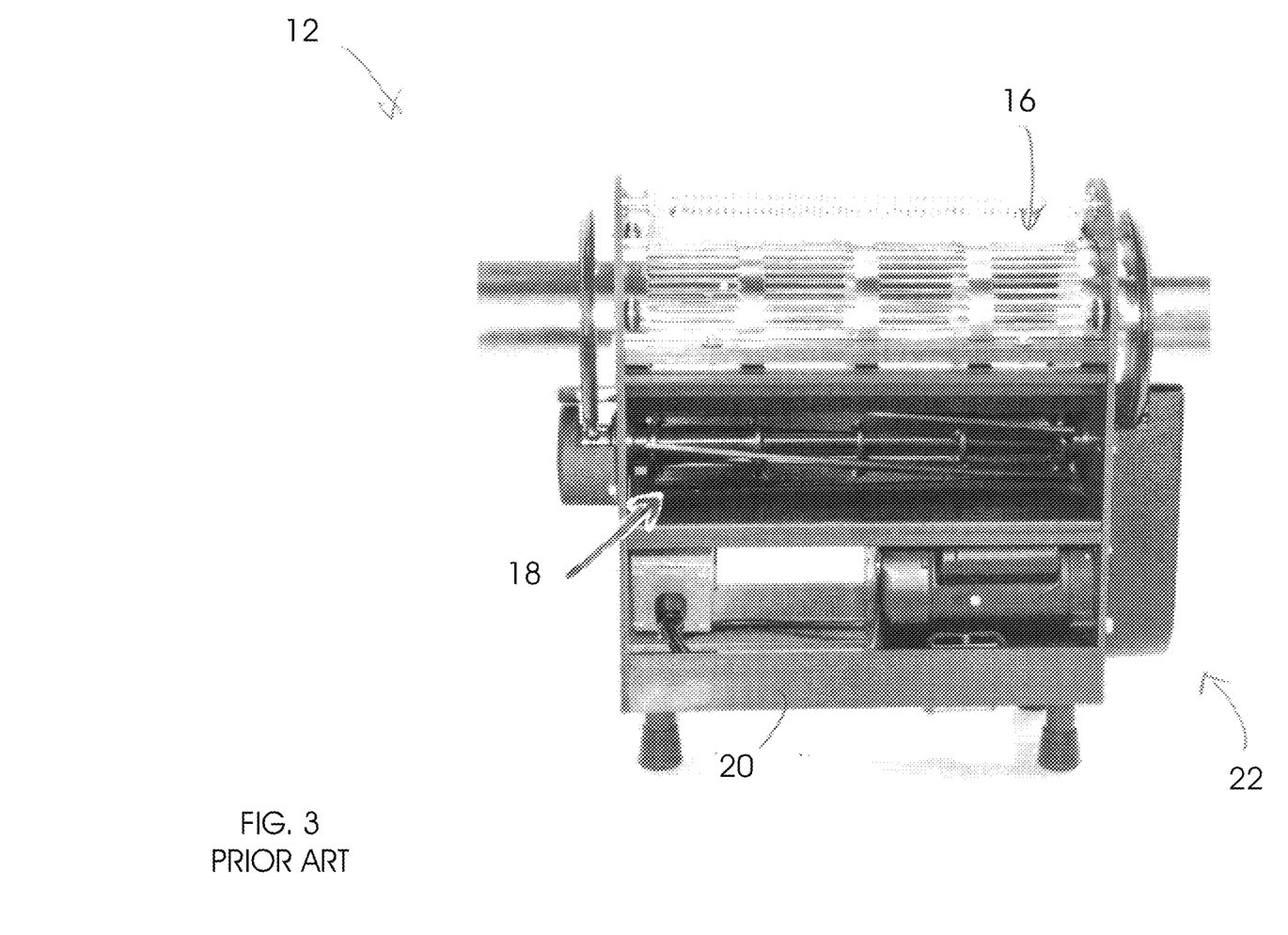
FIG. 3 is a side view of a conventional tumbler trimmer.

FIG. 2 is a line diagram of the essential components of a conventional tumbler trimmer 12. The trimmer 12 has a hollow drum 16 rotating in direction R(D) so that its outer surface is in close proximity to an adjacent rotating blade assembly 18 rotating in direction R(B). In this case, both R(D) and R(B) are the same direction (i.e. clockwise). The material 14 to be trimmed (i.e. untrimmed buds [10A]) are placed into the interior of the drum 16 as it rotates. As the bud [10A] tumbles in the drum 16, the leaves will protrude out through the openings in the wall of the drum 16, where they will be cut off by the blades on the rotating blade assembly 18. The bud is left in the drum 16 until the desired amount of trimming has been completed. FIG. 3 is an example of a machine using this trimming approach.

Figure 4:
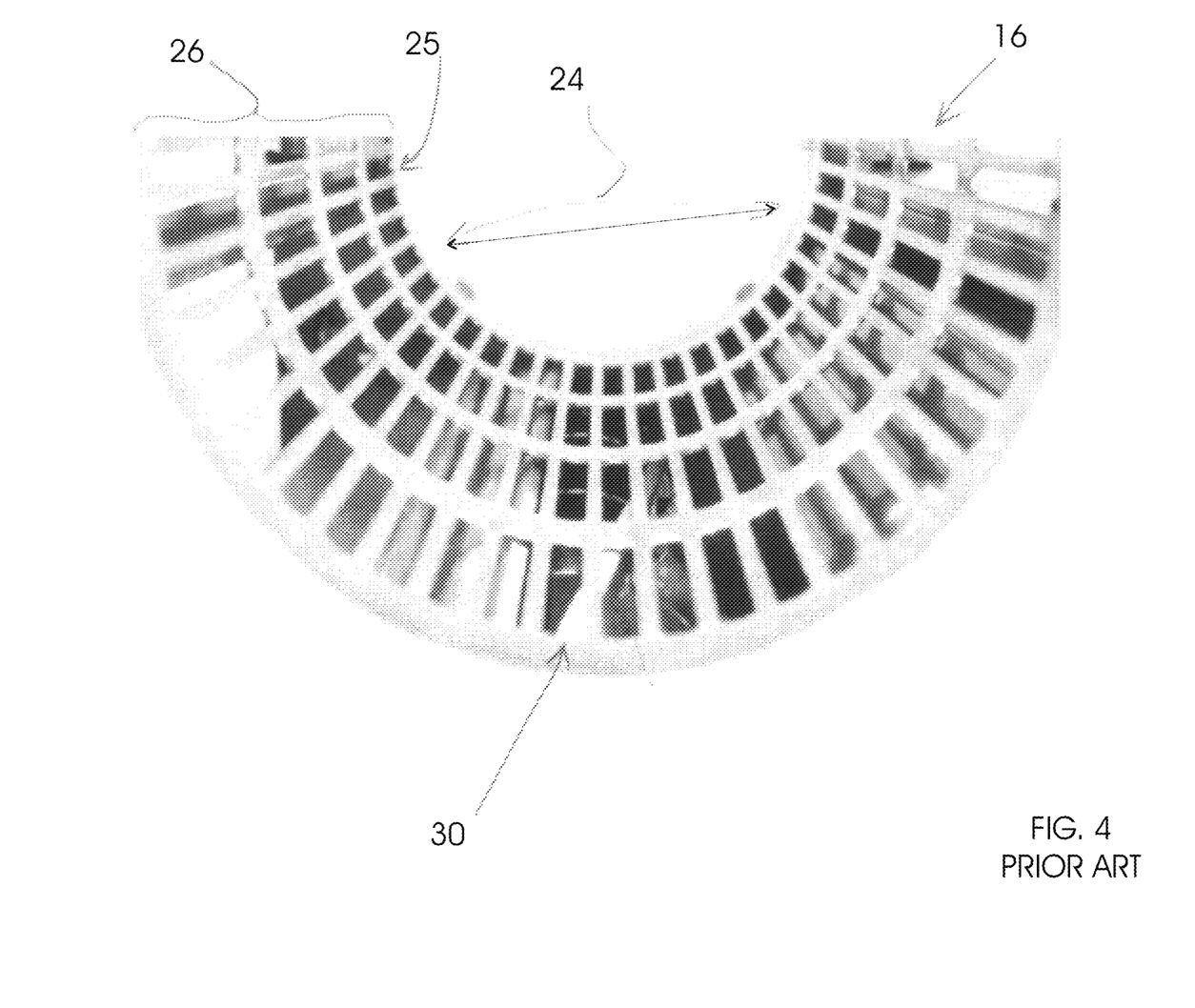
FIG. 4 is a partial front view of the drum of the tumbler trimmer of FIG. 3.

FIG. 3 is a side view of a conventional tumbler trimmer 12. The base 20 has one or more drive mechanisms 22 for causing the rotating drum 16 and the rotating blade assembly 18 to rotate. The typical blade assembly 18 is akin to a conventional push lawn mower—it comprises a series of spiral blades arranged in a cylindrical shape. FIG. 4 gives additional detail regarding the drum 16 and blade assembly 18.

FIG. 4 is a partial front view of the drum 16 of the tumbler trimmer [12] of FIG. 3. The wall 26 of the interior chamber 24 defined by the drum 16 is penetrated by a plurality of elongate slots 28 over its entirety. These slots 28 are designed to allow the leaves surround the bud to protrude through them so that they are cut off by the cutting blades (e.g. 30) as they pass by on the outside of the drum 16.

While the tumbler trimmer 12 does improve productivity by automating the bud trimming process, it does have at least three main defects. First, the buds must be trimmed by the batch, rather than as a continuous process. This requires a worker to load, unload and then monitor the trimming process of each batch, rather than the buds being trimmed and unloaded automatically when completed. Second, the placement of the blade assembly(ies) in relation to the drum 16 (or tumbler) unit. Because of the placement of the blades (external to a single drum 16), the buds aren't being trimmed as quickly as they would be if the trimmer had additional cutting assemblies associated with each drum 16. Finally, the blade assemblies [18] of the conventional device do not compensate for blade wear. As the blades inevitably wear over time, the trimmer [12] must be shut down, so that the blades can be adjusted or replaced. It is in the interest of solving all of these problems that the inventor has created the present invention.

SUMMARY OF THE INVENTION

In light of the aforementioned problems associated with the prior devices and systems, it is an object of the present invention to provide a Concentric Blade Trimming System with Adjustable Blades. The System should include a pair of rotating drums within which are rotating cutting blade assemblies. The system should allow the user to load untrimmed buds continuously to create an efficient, continuous flow of trimmed buds to be generated. The cutting blade assemblies should rotate within the rotating drums in independent fashion. The cutting blade assemblies should also include apparatus that will automatically maintain the blade position relative to the interior walls of the drums so that the trimming process can continue without the need to shut down for blade adjustment. An alternate version should employ flexible cutting blades and a manual blade adjustment mechanism that provides the ability to adjust the blades without the need for a prolonged shutdown of the equipment.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Concentric Blade-Trimming System with Adjustable Blades.

Figure 5:
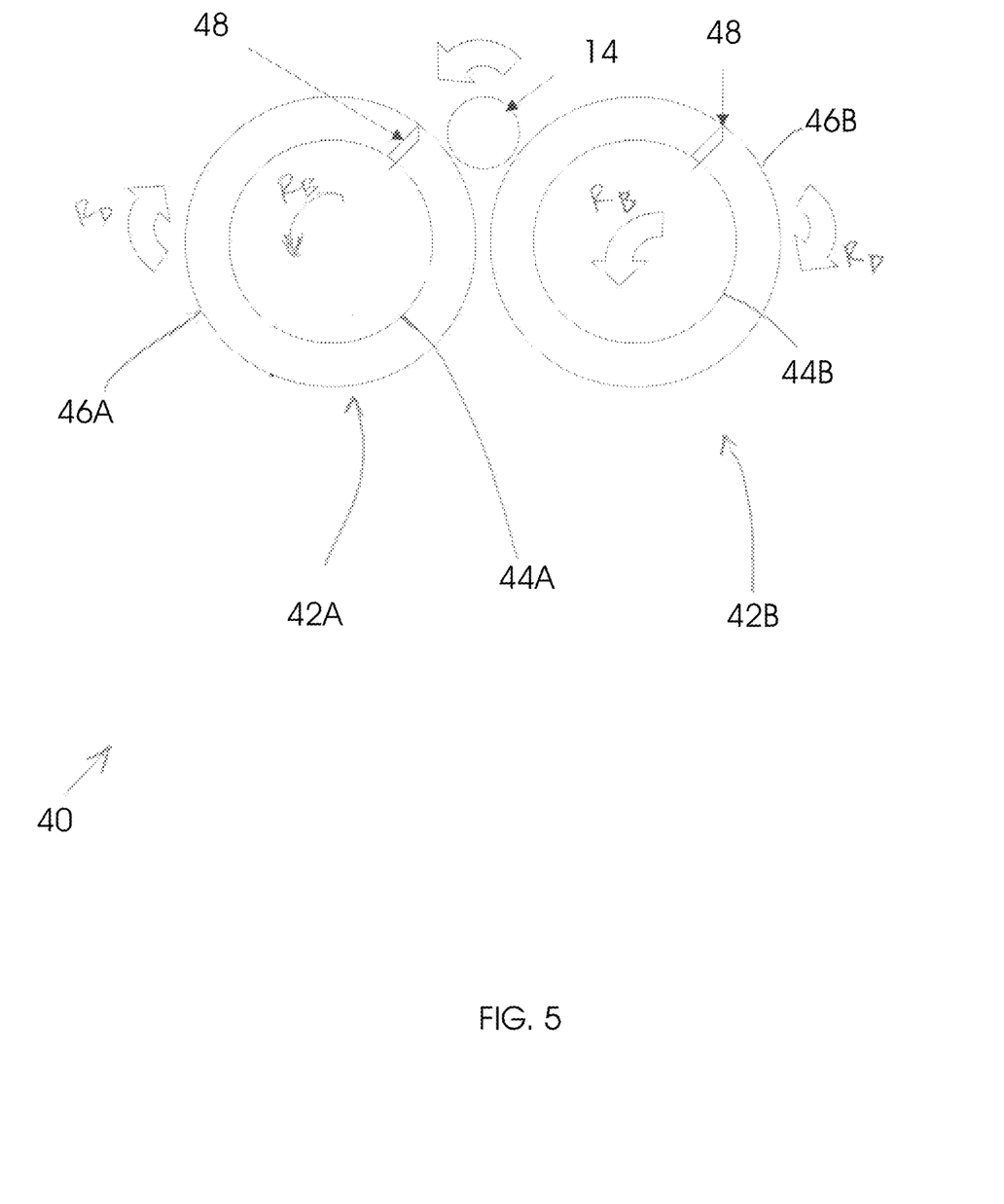
FIG. 5 is a line diagram of the essential components of the preferred embodiment of the concentric drum trimmer of the present invention.

The present invention can best be understood by initial consideration of FIG. 5.[1] FIG. 5 is a line diagram of the essential components of the preferred embodiment of the concentric drum trimmer 40 of the present invention. There are three critical distinctions between the operation of this trimmer 40 and the tumbler trimmer [12]. First, the material 14 is not loaded into the interior of the drums 46A, 46B, but rather are placed atop the drums 46A, 46B. Second, the blade assemblies 44A, 44B are inside of the drums 46A, 46B, rather than next to them. Each pair of drum and blade is referred to as a concentric trimmer assembly—here, there are two—first and second concentric trimmer assemblies 42A, 42B. It is the form and functionality of these blade assemblies 44A, 44B that is a critical distinction from the aforementioned prior art.

[1] As used throughout this disclosure, element numbers enclosed in square brackets [ ] indicates that the referenced element is not shown in the instant drawing figure, but rather is displayed elsewhere in another drawing figure.

Figure 6:
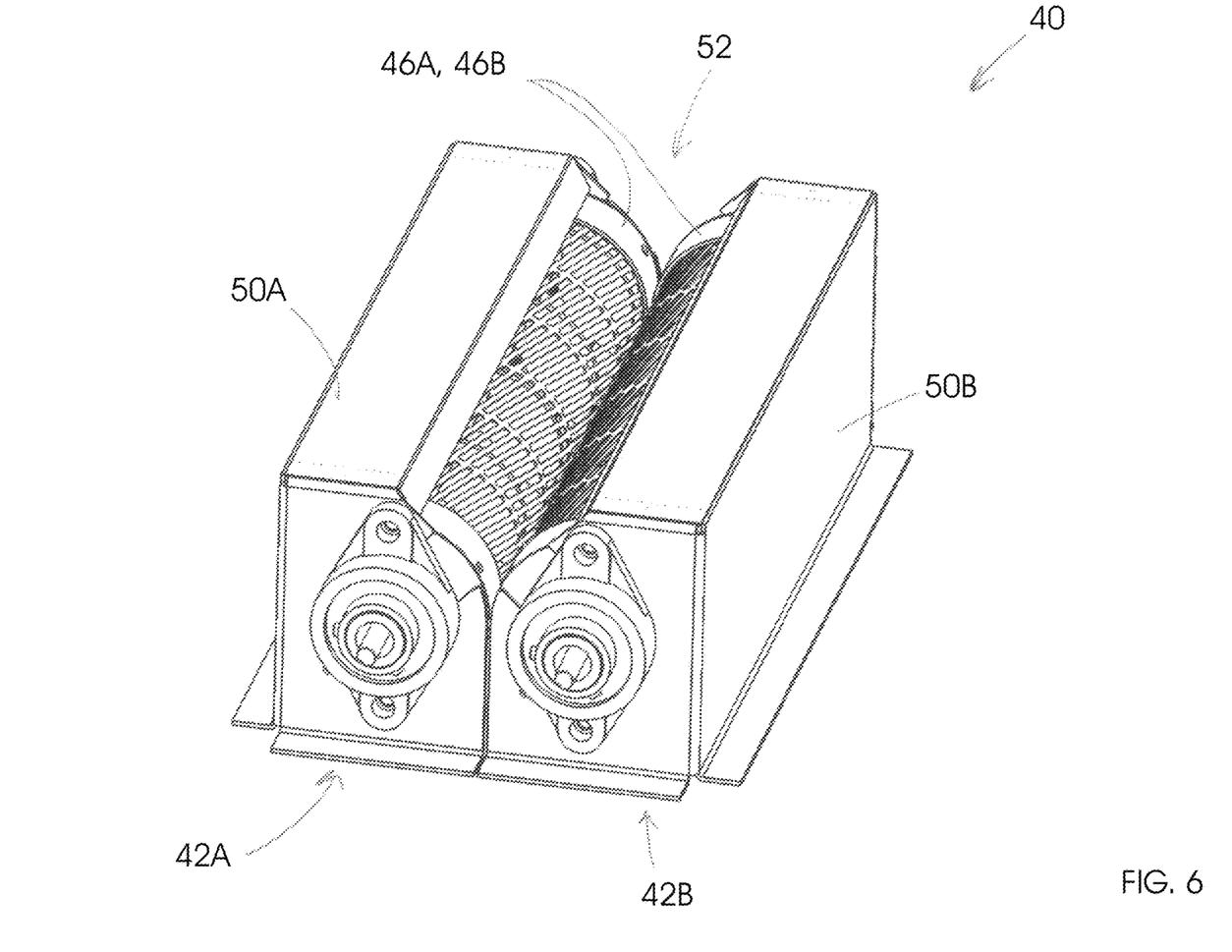
FIG. 6 is a perspective view of a preferred embodiment of the concentric drum trimmer of the present invention.

The drums 46A, 46B rotate in the same relative direction R(D) (e.g. clockwise as depicted here). In contrast, the inner blade assemblies 44A, 44B rotate in the opposite direction R(B) relative to the drums 46A, 46B (e.g. counter-clockwise as depicted here). As should be apparent, the bud material 14 will rotate in the opposite direction as compared to the drums 46A, 46B. The leaves of the buds will protrude through the walls of the drums 46A, 46B and thereafter be cut off by the blades 48 of the inner blade assemblies 44A, 44B. This rotational motion is merely exemplary of one version of the instant invention; the blade assemblies 44A, 44B in any version rotate independently of the drums 46A, 46B. FIG. 6 provides additional detail regarding this novel device.

Figure 7:
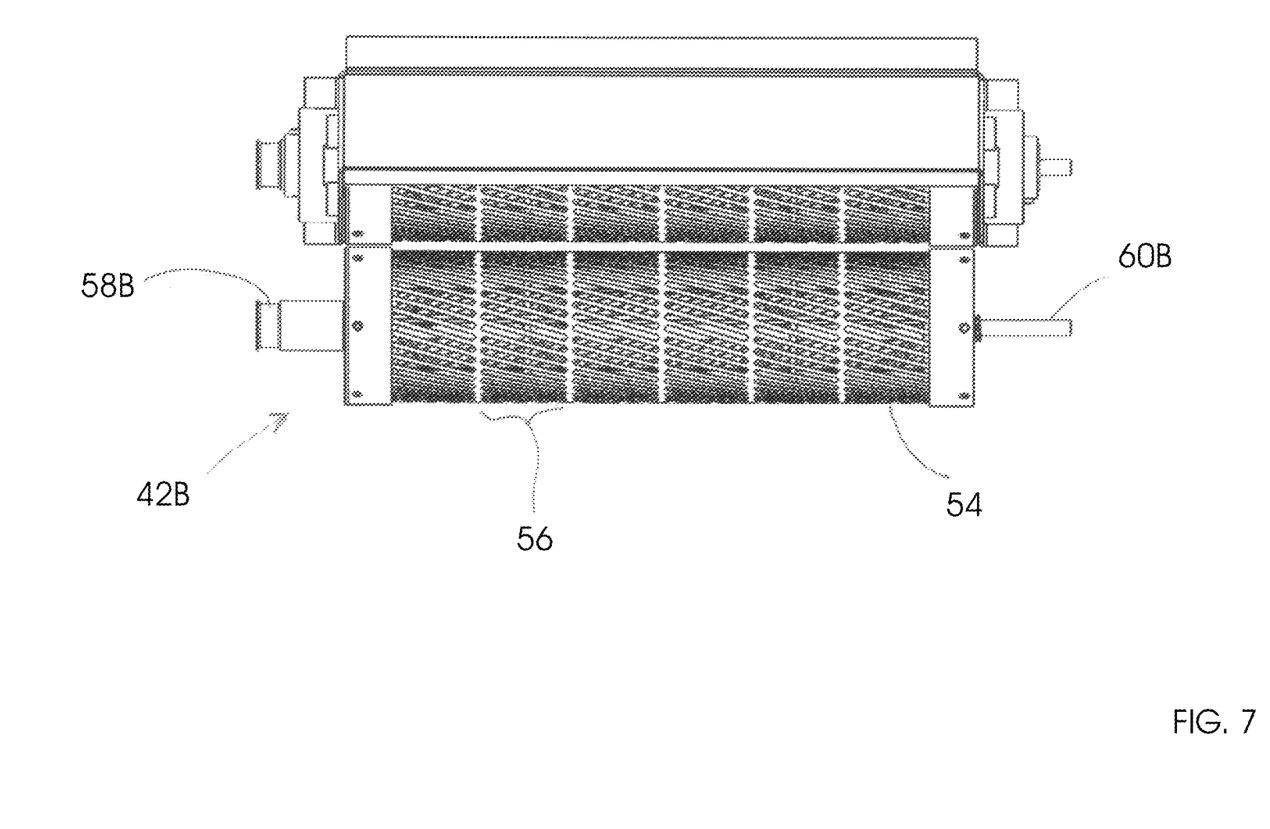
FIG. 7 is a top view of the trimmer of FIG. 6.
Figure 8:
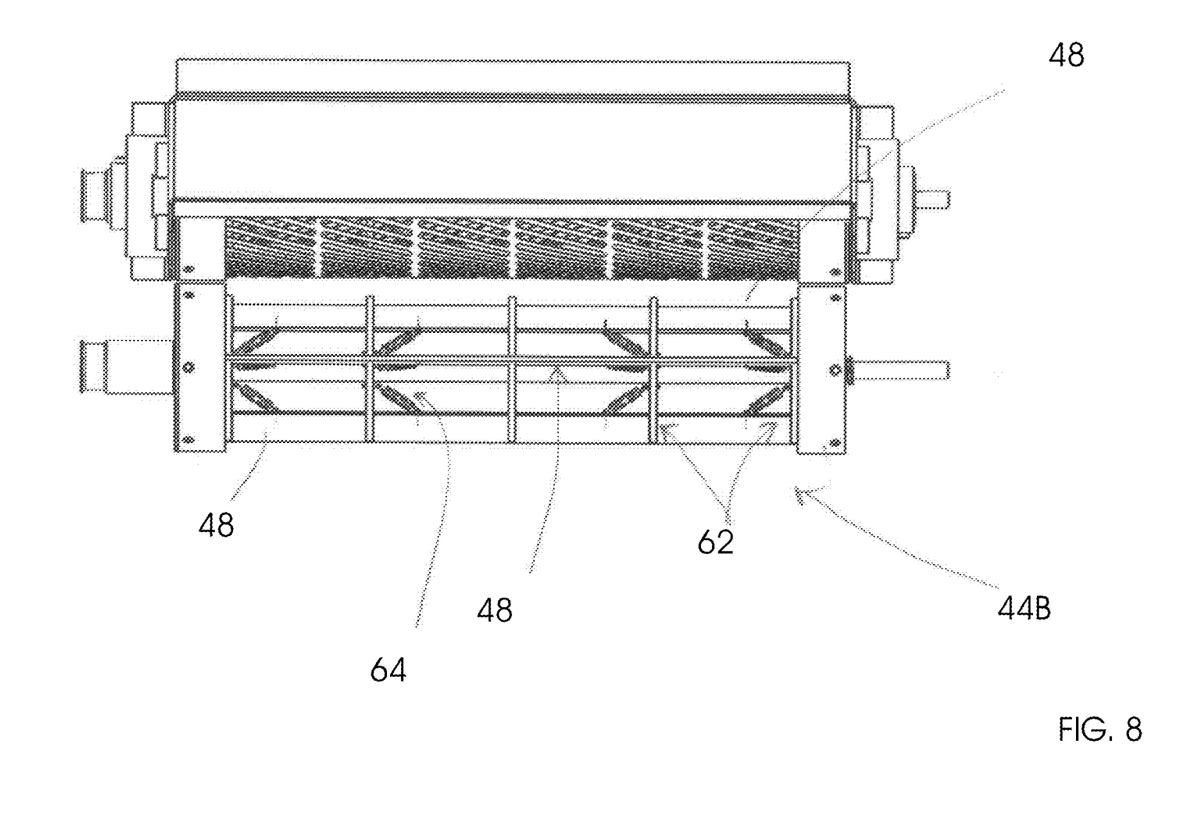
FIG. 8 is another top view of the trimmer of FIG. 6.
Figure 9:
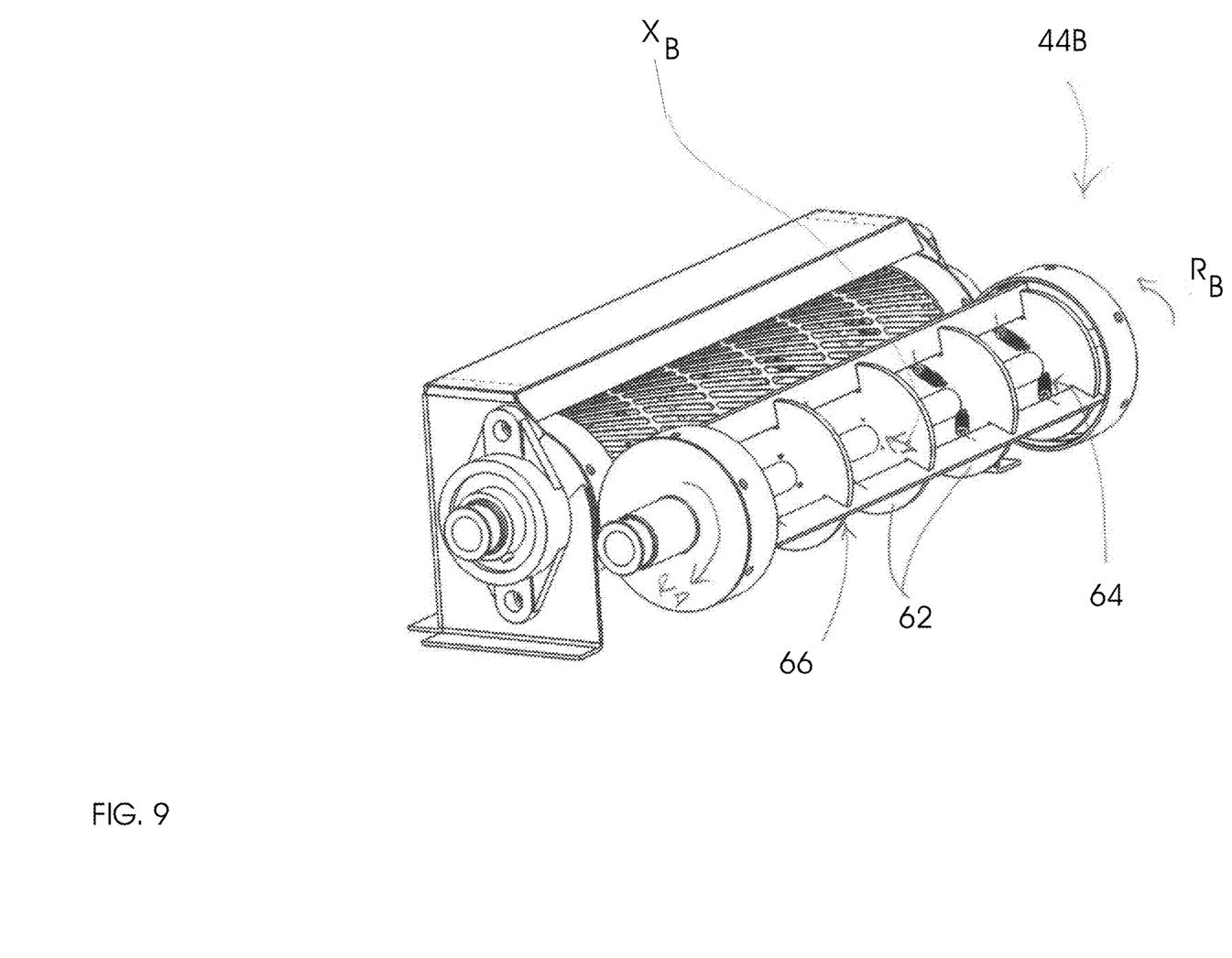
FIG. 9 is a partial perspective view of the trimmer of FIG. 6.

FIG. 6 is a perspective view of a preferred embodiment of the concentric blade trimmer 40 of the present invention. The first and second concentric trimmer assemblies 42A, 42B are mounted within housings 50A, 50B (or alternatively in a single housing) so that they are side-by-side in close relative proximity to form a hopper 52 for the bud material to be trimmed. The drums 46A, 46B could be shaped or otherwise configured so that the hopper 52 has a slope to it. This would tend to encourage the material 14 to move from one end of the hopper 52 to the other as it is tumbled. In this way, the length of the concentric trimmer assemblies 42A, 42B could be designed so that the buds will be fully trimmed before they reach the end of the hopper 52. The system 40 could then be designed to drop the trimmed buds into a bin, for example. As such, the worker need only load material 14 into the hopper 52 and then periodically take away the bin of trimmed buds. FIGS. 7-9 provide additional detail about the design of this device. In its variety of forms, there will be a series of chambers, gateways, tunnels, and/or other features that ensure that each piece of material will get optimal exposure to the blade assemblies as they move from one end of the machine to the other between the rotating drums 46A, 46B. Although it is not depicted in these Figures, in some versions, there will be a more sophisticated housing 50A, 50B design. Specifically, the housings 50A, 50B may cover a portion of the top of the trimmer 40, and further be provided with "windows" or other openings therein. For example, there may be an opening in the housing at the "feed" end of the trimmer 40 that is configured to allow the user to attach a vertical "feed hopper." This "feed hopper" would then be loaded by the operator, and material would gravity feed into the rotating drums 46A, 46B at the "feed end" of the trimmer 40.

FIG. 7 is a top view of the trimmer 40 of FIG. 6. In this version, the blade drive shaft 60B extends from one end of the concentric trimmer assembly 42B, and the drum drive shaft 58B extends from the opposing side. Therefore, the blade assembly [44B] can be rotated completely independently of the drum 46B.

The wall 54 of the drums (e.g. 46B) is designed with a plurality of slots 56 formed therethrough. These slots 54 are preferably angled relative to the axis of rotation of the drum 46B. This configuration will function most efficiently with the orientation of the cutting blades of the trimmer 40 as described below in FIGS. 8 and 9.

FIG. 8 is another top view of the trimmer 40 of FIG. 6. In this view, the drum 46B has been removed such that the inner blade assembly 44B is exposed. The blade assembly 44B is radically different than the blade assembly [18] of the prior trimmer. Rather than spiral-shaped blades, this assembly 44B has a plurality of straight blades 48 dispersed around the circumference of the assembly 44B. The blade element assemblies 48 are supported by a series of guide discs attached to the drive shaft 60B running down the center of the blade assembly 44B. The blade element assemblies 48 are further retained in position by a series of retention springs 64 along their length. FIG. 9 provides additional detail.

FIG. 9 is a partial perspective view of the trimmer 40 of FIG. 6. In this perspective view, the blade element assemblies 48 can be seen to slidingly engage the blade slots 66 formed in the guide discs 62. While they are pulled towards the center of the inner blade assembly 44B (i.e. towards the blade shaft 60B) by the retention springs 64, the springs 64 are selected to also permit the blade element assemblies 48 to slide outwardly (direction X(B)). This outward movement is the result of applied forces that will be imposed on the blade after assembly 44B has been inserted into drum 46B. The applied forces may be achieved by mechanisms including, but not limited to levers, cams, springs, ramps, magnets, and centrifugal action. Generally, the cutting edges of the blade element assemblies 48 will be in contact with or in close proximity to the inner walls of the drums [e.g. 46B], so that an effective trimming action occurs. The profile of the cutting edge of each blade element will be complimentary to the profile of the slots formed in drum 46B such that an efficient trimming action occurs. The profile of the cutting edge of each blade element will be complimentary to the profile of the inner wall of drum 46B such that an efficient trimming action occurs. Each blade element assembly 48 will possess a spring element that applies force, in an outward radial direction, to ensure that the cutting edge maintains contact with the inner wall of drum 46B. As the cutting edges of the blade element sub-assemblies 48 begin to wear, or as the inner diameter of the drums 46B may vary, to continue to cut effectively. For this reason, it is expected that the blade elements 48 will have a longer service life in between sharpening and/or replacement, which will translate into overall uptime of the system.

Figure 10:
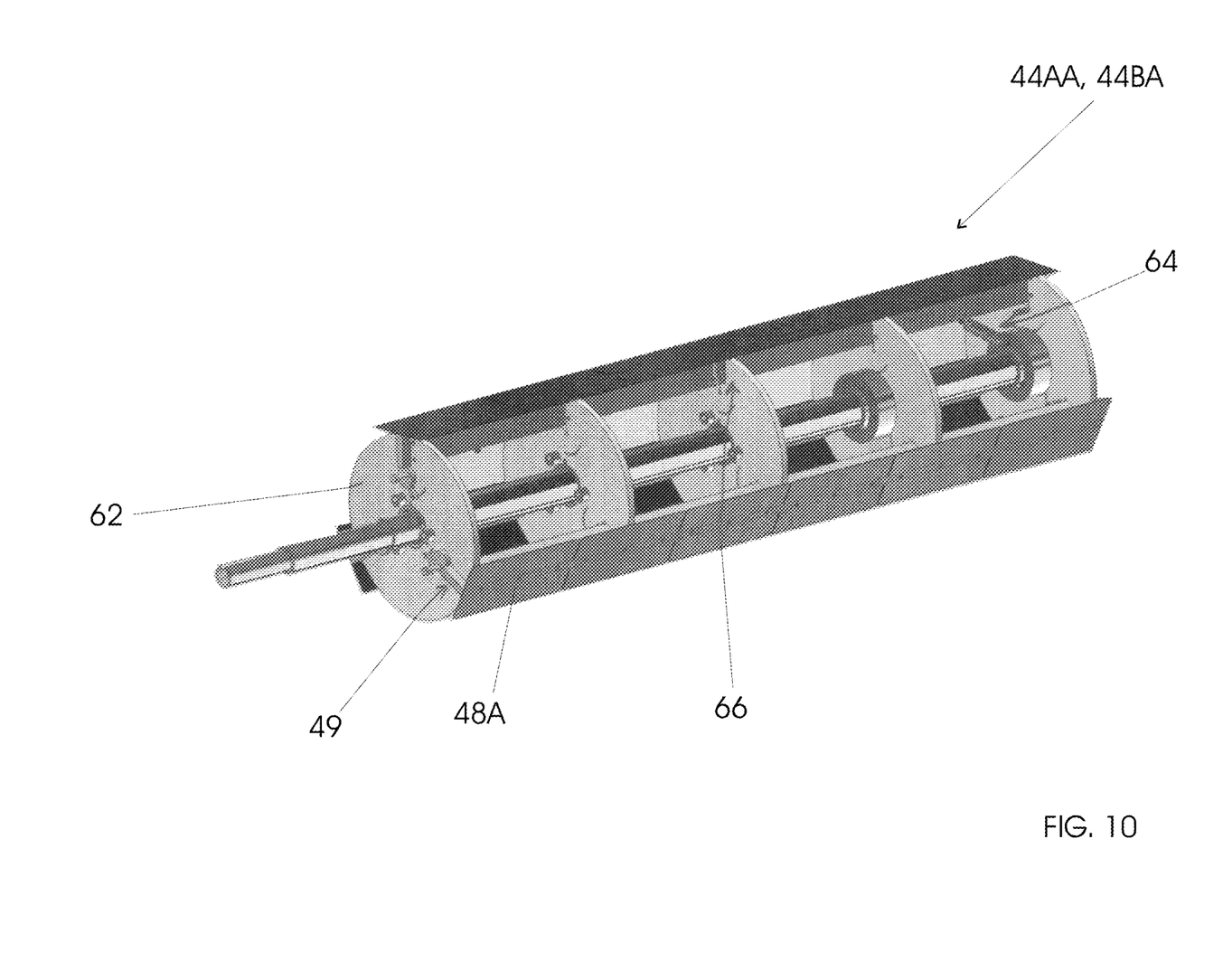
FIG. 10 is a perspective view of an alternate inner blade assembly.

FIG. 10 is a perspective view of an alternate inner blade assembly 44AA, 44BA that can be used inside of both drums [16]. There are some differences between this assembly 44AA, 44BA, and the one previously discussed. First, the blade elements 48A are oriented at a tangent to the outer edges of the guide disks 62. Second, the blade elements 48A are made from a flexible, spring-like material that allows the blade elements 48A to flex or curl along their length to conform to the internal shape of the drums [16] as will be discussed further below.

The blade elements 48A are mounted to elongate blade mount elements 49. These blade mount elements 49 are configured to slide in and out (radially relative to the center axle) along the slots 66 formed in the guide disks 62. The blade mount elements 49 are biased towards the center axle by a series of retention springs 64. If we now turn to FIG. 11, we can examine the operation of this assembly.

Figure 11:
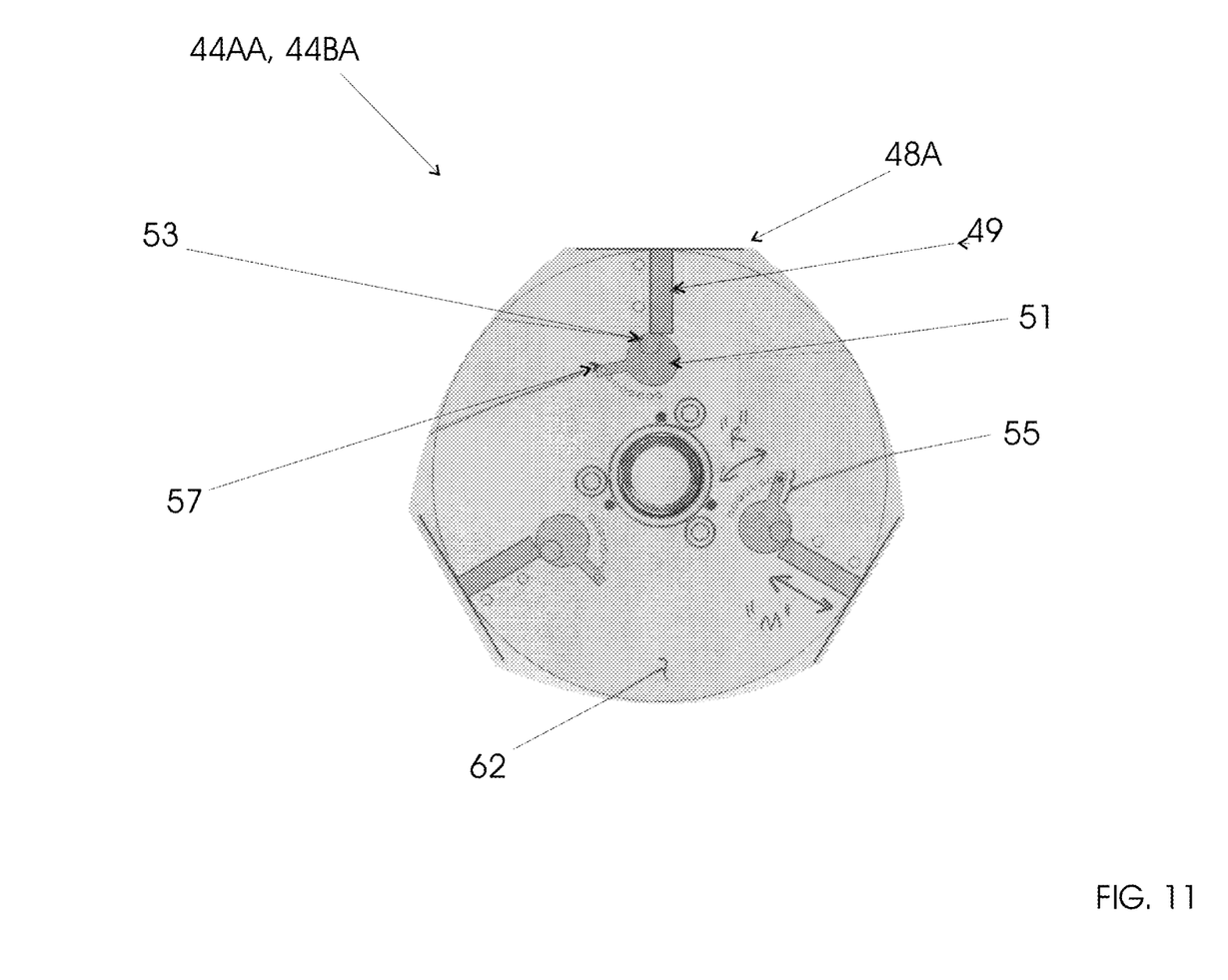
FIG. 11 is an end view of the assembly of FIG. 10.

FIG. 11 is an end view of the assembly 44AA, 44BA of FIG. 10. The depicted mechanisms are found on the outer surfaces of the guide disks located at the two ends of the assemblies 44AA, 44BA. Each flexible blade element 48A is attached to the distal face of a blade mount element 49. The blade mount elements 49 slidingly engage the guide disks 62 in the radial blade slots formed in them.

A cam element 51 is rotatably attached to the guide disk 62 at the proximal face of each blade mount element 49. The cam elements 51 are attached to the guide disk 62 by pivot pins 53, around which they can be rotated. Since the pivot pins 53 are placed in spaced relation to the geometric center of the cam elements 51, the outer surfaces of the cam elements 51 will exhibit a cam-like motion, such that the outer surface will move outwardly as the cam elements 51 are rotated in Direction "R." As the securing levers 55 are rotated counter-clockwise (in this view), the outer surfaces of the cam elements 51 will drive the blade mount elements outward (radially), which will also drive the flexible blade elements 48A outward.

A locking pin 57 at the tip of each securing lever 55 can be depressed into an aperture formed in the face of the guide disk 62 in order to fix the rotation of the cam elements 51 in a rotational position.

Figure 12A:
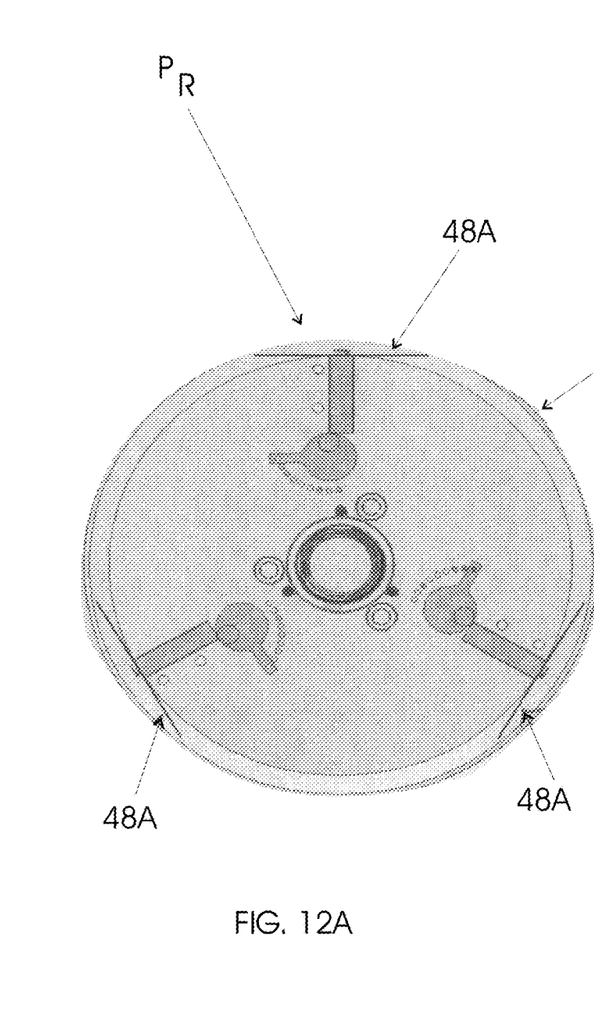
FIGS. 12A and 12B are end views of the assembly of FIGS. 10 and 11.
Figure 12B:
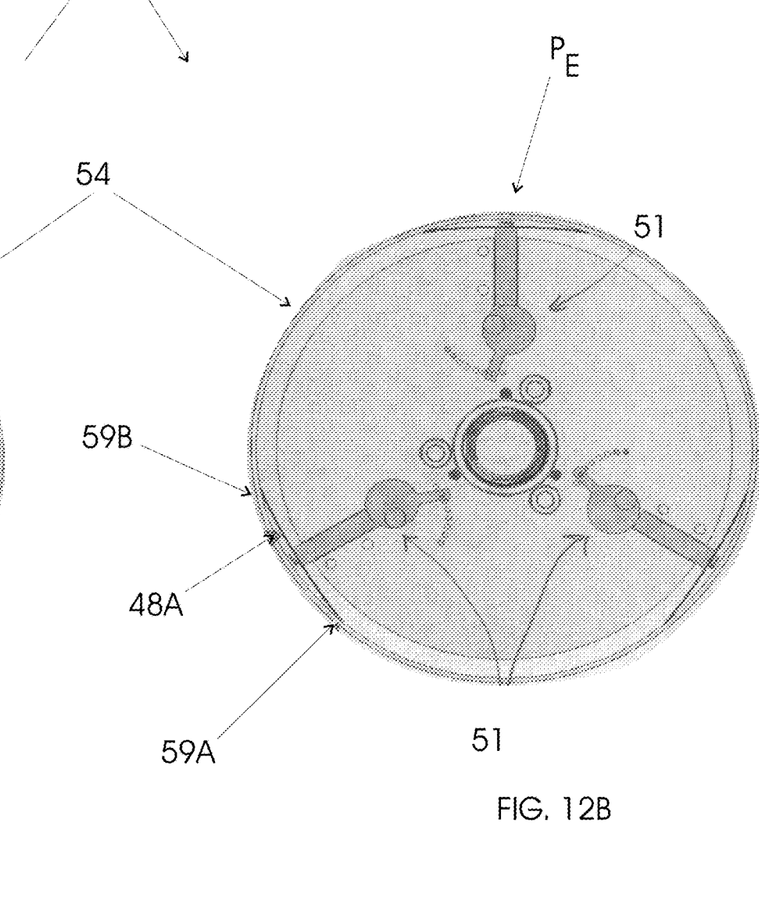
Figure 13:
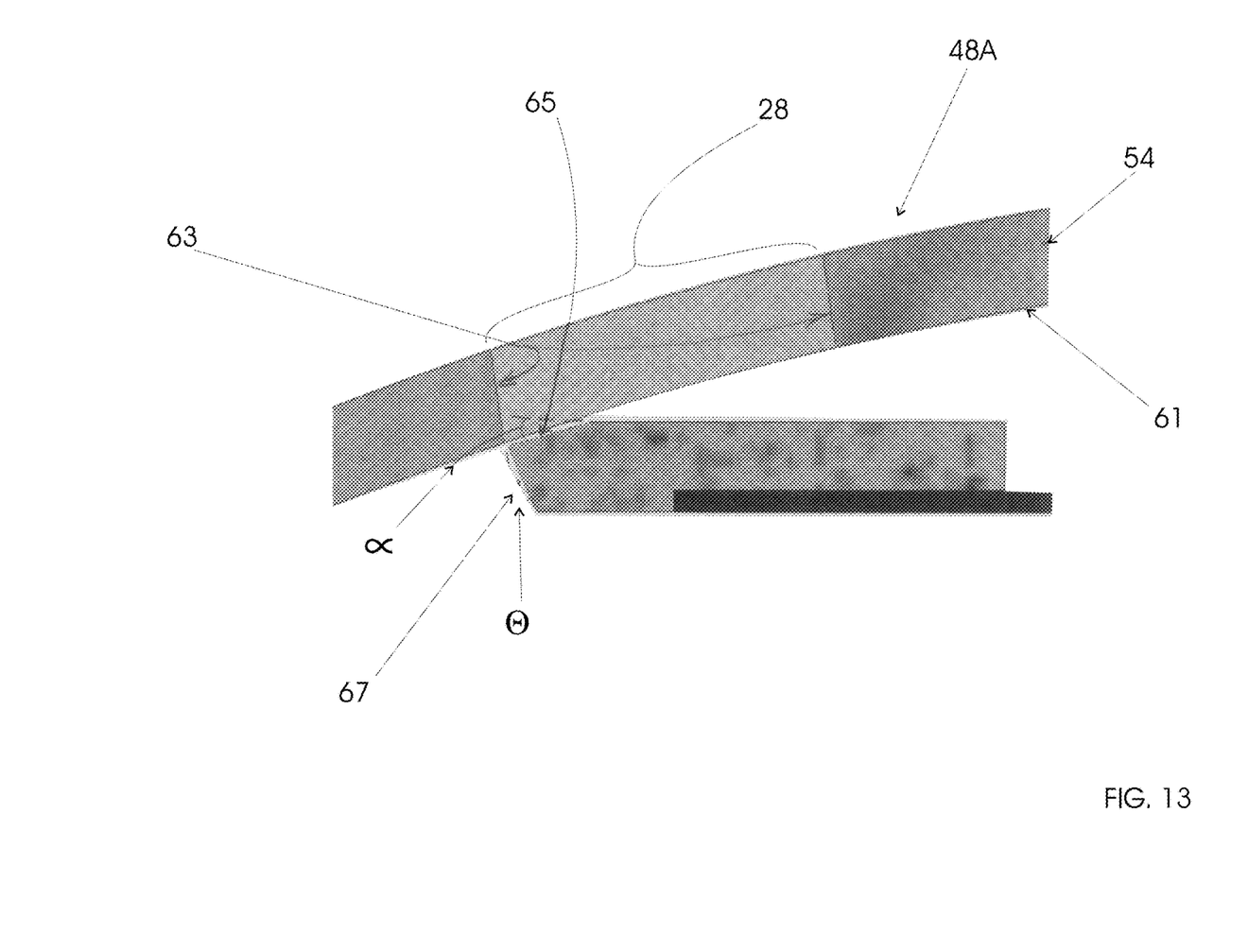
FIG. 13 is a cutaway end view of a blade edges of the assembly of FIG. 10.

FIGS. 12A and 12B are end views of the assembly 44AA, 44BA of FIGS. 10 and 11. FIG. 12A depicts the blade elements 48A in their fully retracted position P(R), where the blade elements 48A are not in contact with the inner surface of the drum wall 54. This position would be used for inserting or removing the blade assembly 44AA, 44BA from the rotating drum [16]. In FIG. 12B, the three cam elements 51 have been rotated in order to drive the three blade elements 48A radially outward until the edges 59A, 59B come in contact with the inner surface of the drum wall 54. The blade elements 48A will ideally flex slightly in order to create a biasing force against the drum wall 54. The assembly 44AA, 44BA is described as being in the extended position P(E). FIG. 13 depicts the preferred geometry of the cutting edges of the blade elements 48A.

FIG. 13 is a cutaway end view of a blade edges 59A of the assembly of FIG. 10. The outer cutting face 65 of the blade element 48A is at an angle $\alpha$ to rest of the blade element 48A. Angle $\alpha$ results in the outer cutting face 65 being approximately parallel to a tangent drawn to the inner surface 61 of the drum wall 54 at the point of contact between the blade element 48A and the drum wall 54.

The leading face 67 of the blade elements 48A are preferably at angle $\theta$, which results in the leading face 67 being approximately parallel to the walls 63 of the slots 28 formed in the drum wall 54. These two cutting angles $\alpha$ and $\theta$ have been determined to result in very efficient cutting of the buds.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An assembly for trimming leaves from the outside of buds, comprising:
   an external drum defined by an elongated cylindrical wall having a plurality of slots formed through said wall to interconnect the outer surface and the inner surface defined by said wall;
   an internal trimmer assembly comprising one or more blade elements in contact with said inner surface of said drum wall; and
   a drive system for rotating said internal trimmer assembly and said external drum in relative opposing directions.

2. The assembly of claim 1, wherein said slots formed in said drum wall are spiral-shaped.

3. The assembly of claim 2, further comprising:
   a second external drum defined by an elongated cylindrical wall having a plurality of slots formed through said wall to interconnect the outer surface and the inner surface defined by said wall;
   a second internal trimmer assembly comprising one or more blade elements in contact with said inner surface of said second drum wall; and
   wherein said drive system rotates said first and second drum assemblies in the same relative direction, and said second internal trimmer assembly and said second external drum in relative opposing directions.

4. The assembly of claim 3, wherein each said internal trimmer assembly comprises:
   a central axle passing through the centers of two or more guide discs; and
   wherein said blade assemblies extend from outer peripheries of said guide discs.

5. The assembly of claim 4, wherein said blade assemblies are attached to blade mount elements, said blade mount elements extending between said guide discs and in sliding engagement therewith.

6. The assembly of claim 5, further comprising an adjustment mechanism at opposing ends of each said blade mount element, said adjustment mechanism configured to radially extend and retract said blade mount elements.

7. The assembly of claim 6, wherein said blade elements are attached to said blade mount elements such that they are parallel with a tangent line defined by said inner surfaces of said drums at said blade elements.

8. The assembly of claim 1, further comprising:
   a second external drum defined by an elongated cylindrical wall having a plurality of slots formed through said wall to interconnect the outer surface and the inner surface defined by said wall;
   a second internal trimmer assembly comprising one or more blade elements in contact with said inner surface of said second drum wall; and
   wherein said drive system rotates said first and second drum assemblies in the same relative direction, and said second internal trimmer assembly and said second external drum in relative opposing directions.

9. A method for trimming leaves from buds, comprising the steps of:
- rotating a pair of adjacent parallel drums in a first rotational direction, said drums defined by a cylindrical wall having an outer surface, and inner surface and a plurality of slots formed through said walls;
- rotating a pair of parallel trimming assemblies located within said parallel drums in a second rotational direction, said second rotational direction opposite to said first rotational direction;
- extending one or more cutting blades from said trimming assemblies until they contact said inner surfaces of said walls of said parallel drums; and
- placing buds atop and between said parallel drums and rotating said drums and said trimming assemblies until said buds are sufficiently trimmed of unwanted said leaves protruding therefrom.

10. The method of claim 9, wherein said slots of said drums of said rotating step comprise spiral shaped apertures.

11. The method of claim 10, wherein said trimming assemblies of said trimming assemblies rotating steps comprise:
- a central axle passing through the centers of two or more guide discs in relative spaced relation; and
- wherein said cutting blades extend from outer peripheries of said guide discs.

12. The method of claim 11, wherein said trimming assemblies of said trimming assemblies rotating steps comprise said blade elements being attached to blade mount elements, said blade mount elements extending between said guide discs and in sliding engagement therewith.

13. The method of claim 12, wherein said trimming assemblies of said trimming assemblies rotating steps comprise an adjustment mechanism at opposing ends of each said blade mount element, said adjustment mechanism configured to radially extend and retract said blade mount elements.

14. The method of claim 9, wherein said trimming assemblies of said trimming assemblies rotating steps comprise:
- a central axle passing through the centers of two or more guide discs in relative spaced relation, wherein said cutting blades extend from outer peripheries of said guide discs;
- said blade elements being attached to blade mount elements, said blade mount elements extending between said guide discs and in sliding engagement therewith; and an adjustment mechanism at opposing ends of each said blade mount element, said adjustment mechanism configured to radially extend and retract said blade mount elements.

15. A bud trimming system, comprising:
- a pair of external drums, each said drum defined by an elongated cylindrical wall having a plurality of non-linear slots formed through said wall to interconnect the outer surface and the inner surface defined by said wall;
- an internal trimmer assembly within each said drum, each said trimmer assembly comprising three or more blade elements in contact with said inner surface of said drum wall; and
- a drive system for rotating said internal trimmer assemblies in a first direction and said external drums in a second direction, with said first and second directions being opposite to one another.

16. The bud trimming system of claim 15, wherein each said internal trimmer assembly comprises:
- a central axle passing through the centers of two or more guide discs; and
- wherein said blade assemblies extend from outer peripheries of said guide discs.

17. The bud trimming system of claim 16, wherein said blade assemblies are attached to blade mount elements, said blade mount elements extending between said guide discs and in sliding engagement therewith.

18. The bud trimming system of claim 17, further comprising an adjustment mechanism at opposing ends of each said blade mount element, said adjustment mechanism configured to radially extend and retract said blade mount elements.

19. The bud trimming system of claim 18, wherein said blade elements are attached to said blade mount elements such that they are perpendicular to a radial line extending from a center of said central axles.

* * * * *